(12) United States Patent
Ho

(10) Patent No.: US 7,530,651 B2
(45) Date of Patent: May 12, 2009

(54) RTA MODULAR DESKTOP CABINET

(75) Inventor: Wen-Te Ho, Taichung (TW)

(73) Assignee: Grace Chance Enterprise Co., Ltd, Shenzhen, Guangdong Province (CN)

( * ) Notice: Subject to any disclaimer, the term of this patent is extended or adjusted under 35 U.S.C. 154(b) by 109 days.

(21) Appl. No.: 11/777,886

(22) Filed: Jul. 13, 2007

(65) Prior Publication Data

US 2009/0015122 A1    Jan. 15, 2009

(51) Int. Cl.
*A47B 47/00*    (2006.01)

(52) U.S. Cl. .................. 312/203; 312/196; 312/257.1

(58) Field of Classification Search .............. 312/194, 312/195, 196, 107, 108, 111, 140, 203, 257.1, 312/263; 108/50.01, 50.11, 59, 60; D6/422, D6/437, 438, 439, 445, 509; 24/287, DIG. 53; 403/231, 348, 349, 409.1, DIG. 12, DIG. 13; 411/349, 549, 550, 553
See application file for complete search history.

(56) References Cited

U.S. PATENT DOCUMENTS

| | | | | | |
|---|---|---|---|---|---|
| 1,052,101 | A | * | 2/1913 | Stiggleman | 312/334.19 |
| 1,225,787 | A | * | 5/1917 | Gardner | 273/351 |
| 2,967,747 | A | * | 1/1961 | Bus | 312/265.5 |
| D249,992 | S | * | 10/1978 | Adkinson | D6/438 |
| 4,869,564 | A | * | 9/1989 | Lechman | 312/195 |
| 4,886,326 | A | * | 12/1989 | Kuzyk | 312/257.1 |
| 5,359,944 | A | * | 11/1994 | Steinbeck | 403/294 |
| 5,472,269 | A | * | 12/1995 | Novikoff | 312/263 |
| 5,667,327 | A | * | 9/1997 | Salice | 403/231 |
| 5,738,422 | A | * | 4/1998 | Welborn et al. | 312/198 |
| D394,763 | S | * | 6/1998 | Zaidman | D6/438 |
| 5,762,442 | A | * | 6/1998 | Salice | 403/231 |
| 5,823,700 | A | * | 10/1998 | Poworoznek | 403/245 |
| 6,158,831 | A | * | 12/2000 | Brown et al. | 312/258 |
| 6,257,796 | B1 | * | 7/2001 | Salice | 403/231 |
| D455,913 | S | * | 4/2002 | Shamie | D6/438 |

* cited by examiner

*Primary Examiner*—James O Hansen
(74) *Attorney, Agent, or Firm*—patenttm.us

(57) ABSTRACT

A ready-to-assemble (RTA) modular desktop cabinet has a multiple dowels, multiple clasp connectors, two side panels, a rear panel, a main shelf, a pedestal assembly and a top panel. The rear panel has a top board and a bottom board. The side panels are mounted parallelly and detachably mounted to the rear panel, the main shelf, the pedestal assembly and the top panel independently using dowels or clasp connectors. Further, the bottom board is hinged to the top board, so that the footprint of the folded rear panel is reduced for transport and storage. Furthermore, the RTA modular cabinet can be assembled and disassembled easily without needing tools.

5 Claims, 5 Drawing Sheets

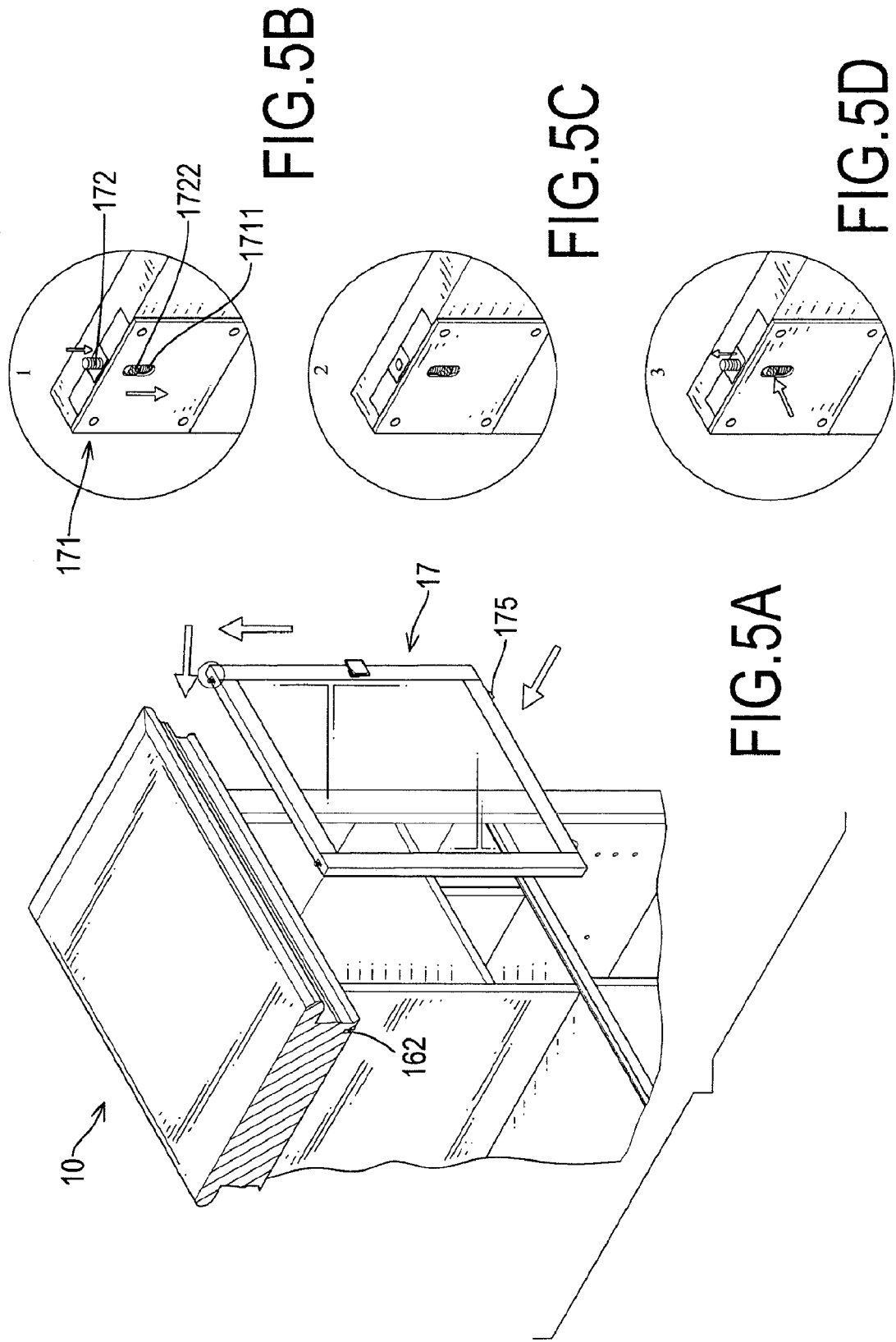

RTA MODULAR DESKTOP CABINET

BACKGROUND OF THE INVENTION

1. Field of Invention

The present invention relates to desktop cabinet, and more particularly to a RTA modular desktop cabinet that is easily assembly.

2. Description of the Related Art

Traditional furniture items such as cabinets are often expensive due to high labor cost required for assembling the cabinets. In addition, transport and storage costs are inflated by assembled furniture having empty chambers.

Ready-to-assemble (RTA) furniture reduces manufacturing, transport and storage costs are reduced. However, assembly of conventional RTA furniture requires at least one tool such as wrenches, screwdrivers, hex-keys or even power tools thereby dissuading some people from purchasing RTA furniture.

The present invention provides a RTA modular desktop cabinet to obviate or mitigate the shortcomings of the conventional ready-to-assemble furniture and the traditional furniture.

SUMMARY OF THE INVENTION

The primary objective of the present invention is to provide a RTA modular desktop cabinet that may be mounted on top of a desk.

The RTA modular desktop cabinet has multiple dowels, multiple clasp connectors, two side panels, a rear panel, a main shelf, a pedestal assembly and a top panel. The rear panel has a top board and a bottom board. The side panels are mounted on a desk and are connected detachably to the rear panel, the main shelf, the pedestal assembly and the top panel independently using dowels or clasp connectors. Further, the bottom board is hinged to the top board, so that the footprint of the folded rear panel is reduced to minimize for transport and storage. Furthermore, the RTA modular cabinet can be assembled and disassembled easily without needing tools.

Other objectives, advantages and novel features of the invention will become more apparent from the following detailed description when taken in conjunction with the accompanying drawings.

BRIEF DESCRIPTION OF THE DRAWINGS

FIG. 5A is an operational perspective view of adjusting a sliding rod of the RTA modular desktop cabinet in FIG. 1;

FIG. 5B is an enlarged operational perspective view of adjusting the sliding rod into a sliding base in FIG. 5A;

FIG. 5C is an enlarged perspective view of the sliding rod being mounted inside the sliding base in FIG. 5A; and FIG. 5D is an another operational enlarged perspective view of adjusting the sliding rod protruding out the sliding base in FIG. 5A.

DETAILED DESCRIPTION OF THE INVENTION

Figure 1:
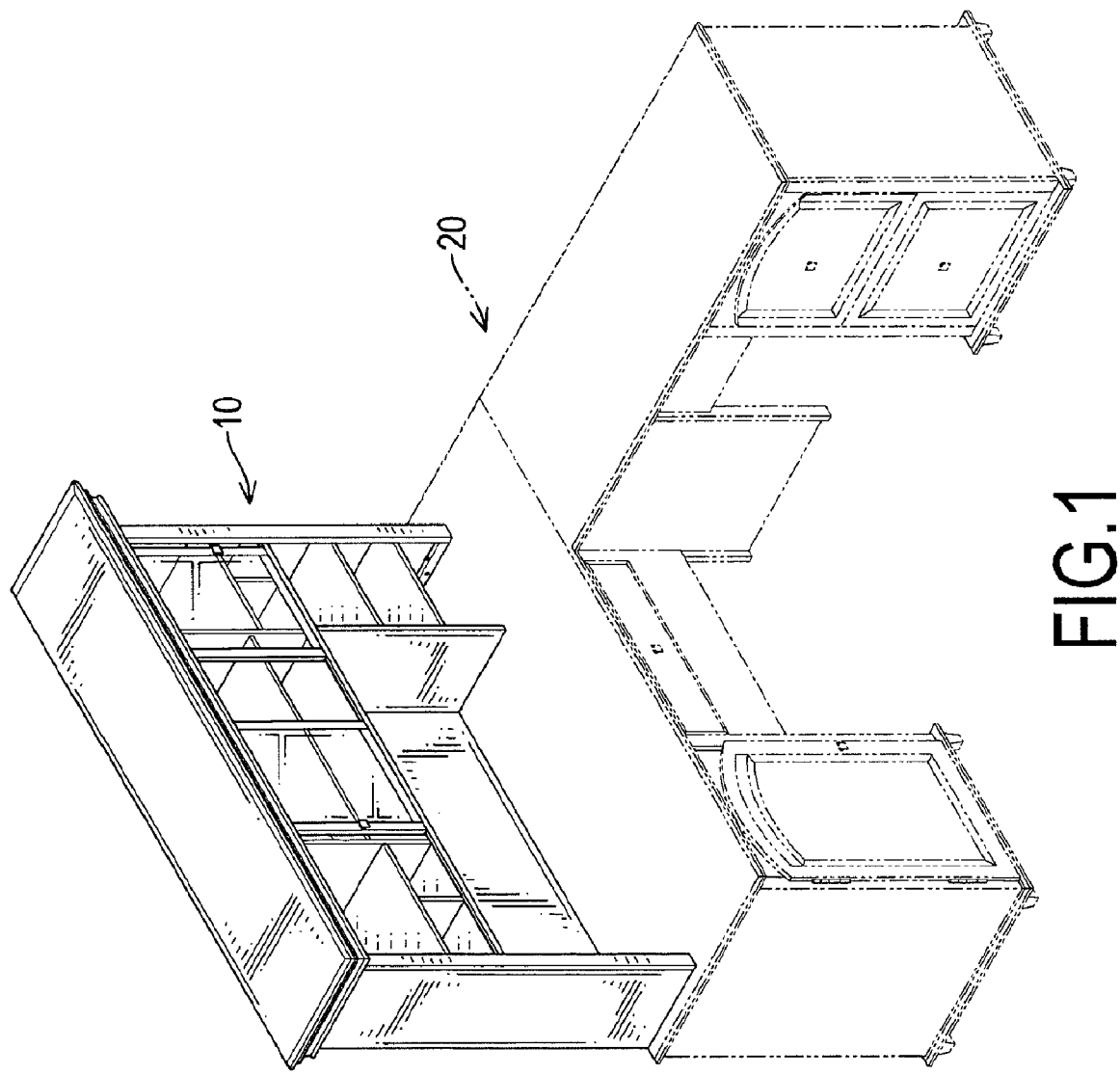
FIG. 1 is a perspective view of a RTA modular desktop cabinet in accordance of the present invention.
Figure 2:
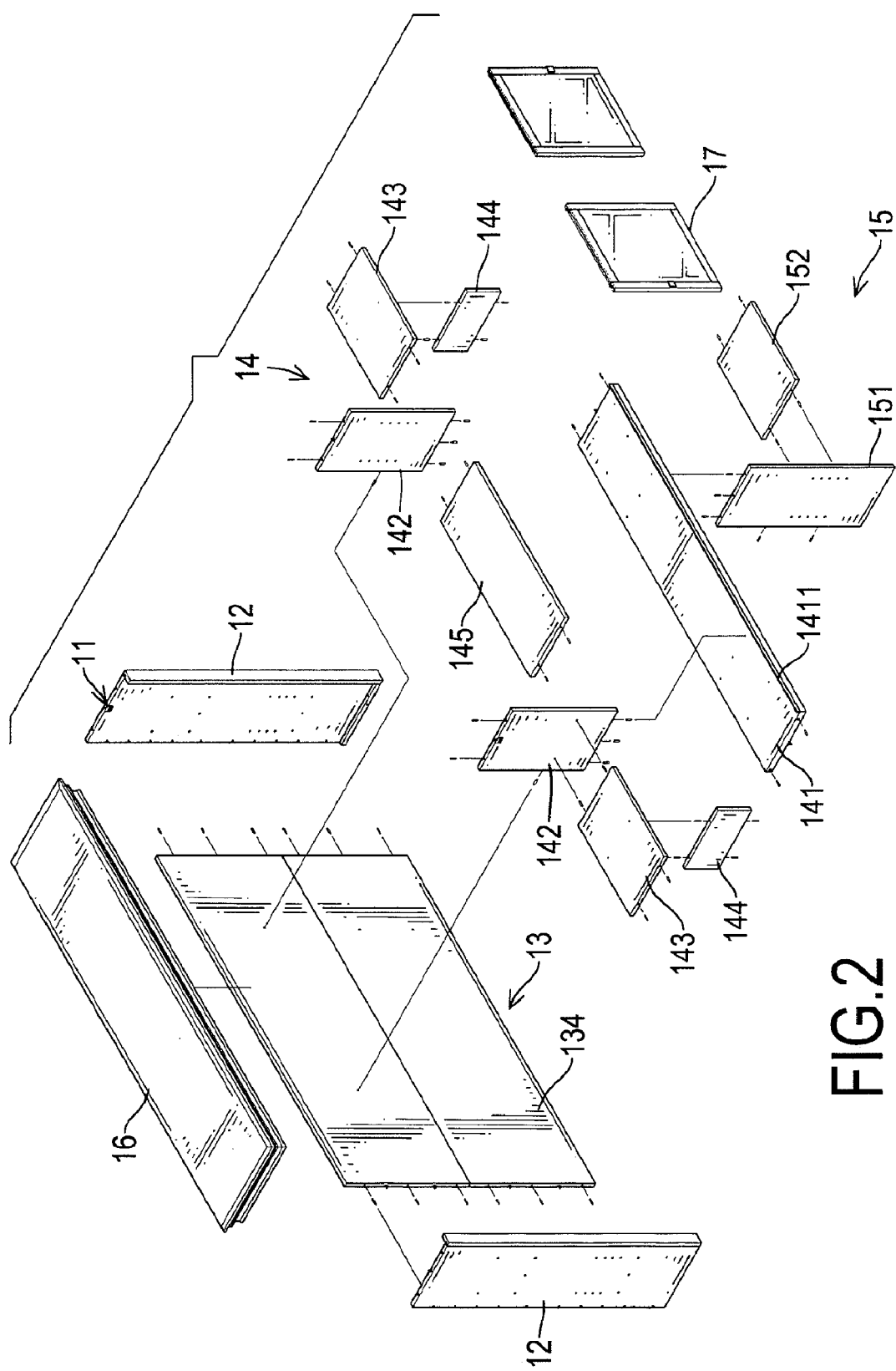
FIG. 2 is an exploded perspective view of the RTA modular desktop cabinet in FIG. 1.

With reference to FIGS. 1 and 2, a ready-to-assemble (RTA) modular desktop cabinet (10) that is mounted on a desk (20) in accordance with the present invention comprises multiple dowels, multiple clasp connectors (11), two side panels (12), a rear panel (13), a main shelf (14), a pedestal assembly (15), a top panel (16) and multiple optional doors (17).

Figure 4A:
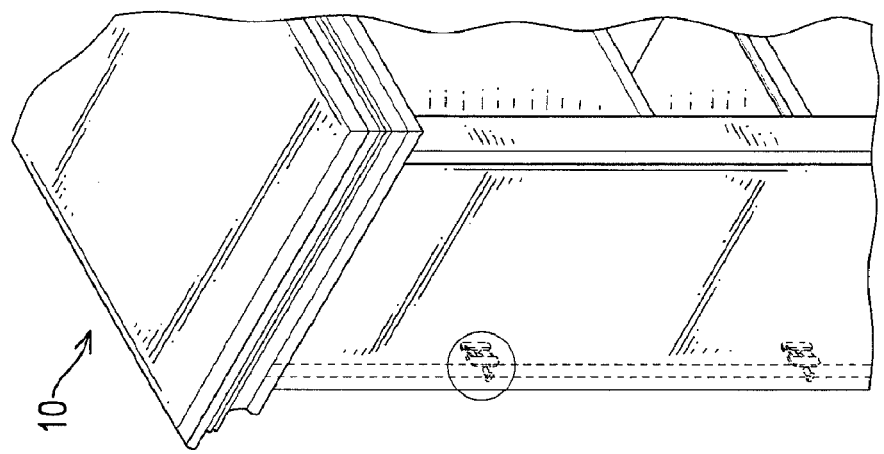
FIG. 4A is an enlarged partial perspective view of the RTA modular desktop cabinet in FIG. 1.
Figure 4B:
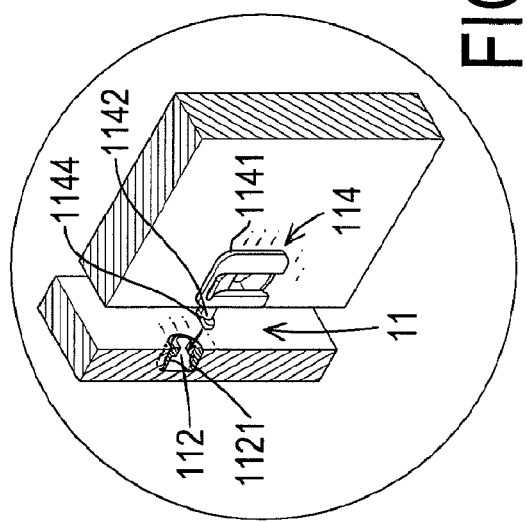
FIG. 4B is an enlarged partial perspective view of a detachable clasp connector in FIG. 4A.
Figure 4C:
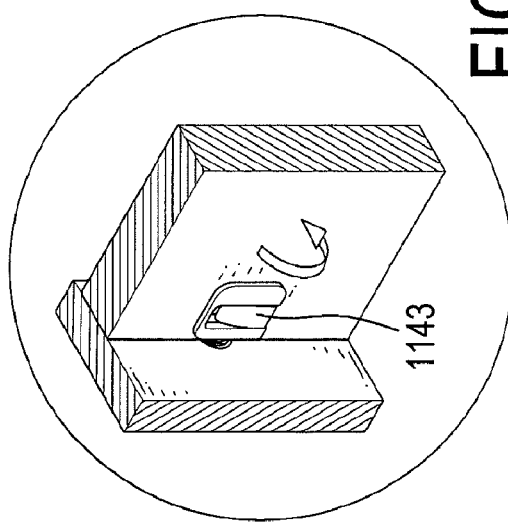
FIG. 4C is an operational perspective view of the detachable clasp connector in FIG. 4B.

With further reference to FIGS. 4A, 4B and 4C, each detachable clasp connector (11) comprises a catch (112) and a latch (114). The catch (112) has an inner surface and a shoulder (1121) formed on and protruding from the inner surface. The latch (114) comprises a base (1141) and a latch bar (1142). The latch bar (1142) is mounted rotatably in the base (1141) and has a distal end, a lever (1143) and a head (1144). The distal end of the latch bar (1142) protrudes from the base (1141). The lever (1143) is mounted on the latch bar (1142) to rotate the latch bar (1142). The head (1144) is formed on and perpendicularly protrudes diametrically from the distal end of the latch bar (1142) and corresponds with the shoulder (1121) of the catch (112). The head (1144) is inserted into the catch (112) then, the latch bar (1142) is rotated and the head (1144) rotates to abut the shoulder (1121) and hold the latch bar (1142) securely in the catch (112).

The two side panels (12) correspond to each other, and each has an inner surface, a bottom edge, a front edge, a rear edge and a top edge. The two side panels (12) are mounted parallelly to each other, and may be perpendicular to the desk (20) so the inner surfaces of the two side panels (12) face each other.

Figure 3:
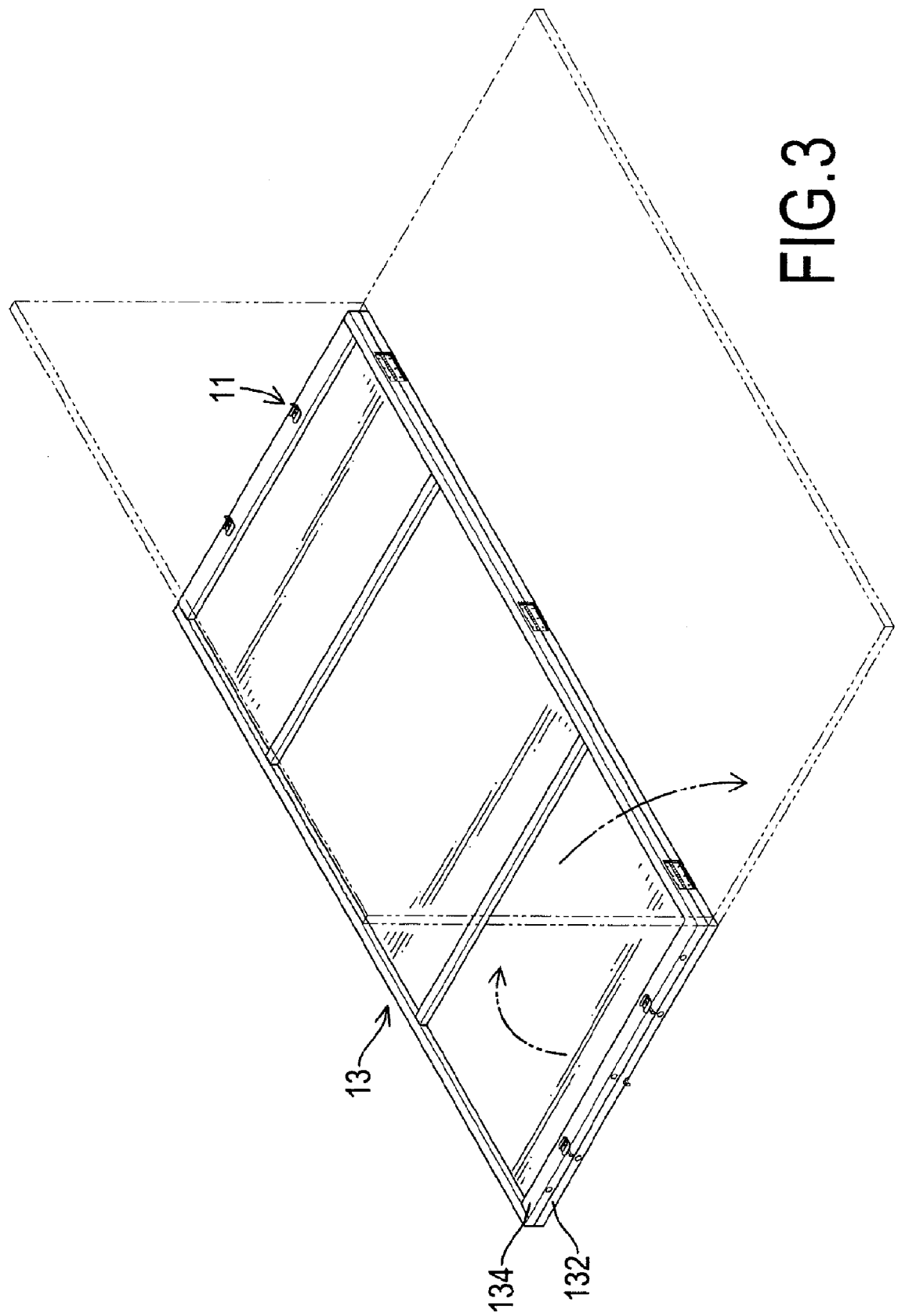
FIG. 3 is an operational perspective view of folding a rear panel of the RTA modular desktop cabinet in FIG. 1.

With further reference to FIG. 3, the rear panel (13) comprises a top board (132) and a bottom board (134). The top board (132) has a front surface, a longitudinal connecting edge and two side edges. The side edges of the top board (132) are respectively connected detachably to the inner surfaces of the side panels (12) close to the rear edges using dowels and clasp connectors (11). The catch (112) of each detachable clasp connector (11) is mounted in the inner surface of each side panel (12) close to the rear edge and the corresponding latch (114) is mounted in the front surface of the top board (132).

The bottom board (134) corresponds to the top board (132) and has a front surface, a longitudinal connecting edge and two side edges. The longitudinal connecting edge of the bottom board (134) connected pivotally to the longitudinal connecting edge of the top board (132) so the top board (132) may be folded to the bottom board (134) to reduce their combined footprint. The side edges of the bottom board (134) is connected detachably with the inner surfaces of the side panels (12) using dowels and the clasp connectors (11).

The main shelf (14) comprises a main shelf base (141), at least one partition (142), at least one optional ancillary shelf base (143) and at least one optional shelf divider (144).

The main shelf base (141) has two connecting edges and a top surface having a front edge. The connecting edges of the main shelf base (141) are detachably mounted on the inner surfaces of the side panels (12) using dowels and clasp connectors (11). The top surface of the main shelf base (141) may have a rail (1411) protruding along the front edge of the top surface of the main shelf base (141).

Each partition (142) is mounted perpendicular on the top surface of the main shelf base (141) using dowels, and each has a bottom edge, a top edge, and two side surfaces. Each ancillary shelf base (143) has two connecting edges and a bottom surface. The connecting edges of each ancillary shelf base (143) are connected respectively to at least one surface of one of the partition (142) using connectors and may be connected to the inner surface of the side panel (12) using connectors. The connectors may be dowels or clasp connectors (11)

Each shelf divider (144) is detachably connected perpendicularly between the ancillary shelf base (143) and the main shelf base (141) using connectors.

The pedestal assembly (15) comprises a shelf panel (151) and at least one pedestal shelf (152). The shelf panel (151) has a top edge, a rear edge and an inner surface. The top edge of the shelf panel (151) is connected detachably to the bottom surface of the main shelf base (141). The rear edge of the shelf panel (151) is connected detachably to the front surface of the bottom board (134). Each pedestal shelf (152) has two connecting edges. The connecting edges of each pedestal shelf (152) are respectively connected detachably to the inner surface of the shelf panel (151) and the corresponding side panel (12) using connectors.

The top panel (16) has a bottom surface having two connecting edges and a front edge. The connecting edges of the bottom surface of the top panel (16) are respectively mounted detachably on the top edges of the side panels (12) using clasp connectors (11). The front edge of the bottom surface of the top panel (16) may have a door slot (162). The door slot (162) is formed along the front edge of the bottom surface of the top panel (16) corresponding to the rail (1411).

With further reference to FIGS. 5A, 5B, 5C and 5D, each door (17) is mounted slidably between the main shelf base (141) and the top panel (16) and each door (17) has a frame and a window mounted in the frame. The frame of the door (17) has a top piece and a bottom piece. The top piece of the frame of the door (17) has an inner surface, a top edge, multiple sliding bases (171) and multiple sliding rods (172). Each sliding base (171) is mounted in the inner surface of the top piece of the frame of the door (17) and has an opening (1711). Each sliding rod (172) is inserted rotatably inside the sliding base (171) and has a distal end and an adjusting wheel (1722). The distal end is adjustably extended into the door slot. The adjusting wheel (1722) is formed around the sliding rod (172) corresponding to the opening (1711), and rotating the adjusting wheel (1722) controls how far the distal end of the sliding rod (172) protrudes from the sliding base (171). The bottom piece of the frame of the door (17) has a bottom edge. The bottom edge of the bottom piece of the frame of the door (17) may have multiple sliding wheels (175) or a slot communicating with and corresponding to the rail (1411). The door is detachably mounted slidably on the rail (1411) and the adjusting wheel (1722) extends the distal end of the sliding rod (172) into the door slot (162) to hold the door (17) on the rail (1411). Furthermore, the RTA modular cabinet (10) is easily assembled and disassembled without needing tools.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A RTA modular desktop cabinet comprising
   two side panels corresponding to and being mounted parallelly to each other, and each having
      an inner surface;
      a bottom edge;
      a front edge;
      a rear edge; and
      a top edge;
   a rear panel having
      a top board having
         a front surface;
         a longitudinal connecting edge; and
         two side edges being respectively mounted detachably to the inner surfaces of the side panels close to the rear edges using at least one dowel and multiple clasp connectors;
      a bottom board corresponding to the top board and having
         a front surface;
         a longitudinal connecting edge being connected pivotally to the longitudinal connecting edge of the top board; and
         two side edges being connected detachably to the inner surfaces of the side panels using at least one dowel and multiple clasp connectors; and
   a main shelf comprising
      a main shelf base being a rectangular board and having
         two connecting edges being detachably mounted perpendicularly on the inner surfaces of the side panels using at least one dowel and multiple clasp connectors; and
         a top surface having a front edge; and
      at least one partition being mounted perpendicularly on the top surface of the main shelf base, and having
         a bottom edge being detachably mounted on the top surface of the main shelf base;
         a top edge; and
         two side surfaces;
   a pedestal assembly having
      a shelf panel having
         a top edge of the shelf panel connected detachably to the bottom surface of the main shelf base;
         a rear edge being connected detachably to the front surface of the bottom board; and
         an inner surface; and at least one pedestal shelf having
            two connecting edges being respectively connected detachably to the inner surface of the shelf panel and a corresponding side panel using at least one dowel and multiple clasp connectors; and
   a top panel being a rectangular board and having a bottom surface having
      two connecting edges being respectively mounted detachably on the top edges of the side panels using multiple clasp connectors; and
      a front edge; wherein
   each clasp connector comprises
      a catch having
         an inner surface; and
         a shoulder being formed on and protruding from the inner surface of the catch; and
      a latch having
         a base; and
         a latch bar being mounted rotatably in the base and having
            a distal end protruding from the base;
            a lever being mounted on the latch bar; and
            a head being formed on and perpendicularly protruding diametrically from the distal end of the latch bar and corresponding with the shoulder of the catch.

2. The RTA modular desktop cabinet as claimed in claim 1, wherein the main shelf further has
- at least one ancillary shelf base having
  - two connecting edges being respectively connected to the at least one partition and a corresponding side panel using multiple shelf connectors; and
  - a bottom surface; and
- at least one shelf divider being detachably connected perpendicularly between the at least one ancillary shelf base and the shelf base using multiple shelf connectors.

3. The RTA modular desktop as claimed in claim 2, wherein the shelf connectors are dowels.

4. The RTA modular desktop cabinet as claimed in claim 2, wherein the shelf connectors are clasp connectors.

5. The RTA modular desktop cabinet as claimed in claim 1, wherein the RTA modular desktop further comprises
- a rail protruding along the front edge of the top surface of the main shelf base;
- a door slot being formed along the bottom surface of the top panel, being parallelly and being located corresponding to the rail; and
- multiple doors being mounted slidably between the shelf base and the top panel, and each door having
- a frame having
  - a top piece having
    - an inner surface;
    - a top edge;
    - multiple sliding bases being mounted in the inner surface of the top piece of the frame of the door and each having an opening; and
    - multiple sliding rods, each sliding rod being inserted rotatably inside one of the sliding bases and having
      - a distal end being adjustably extended into the door slot; and
      - an adjusting wheel being mounted around the sliding rod corresponding to the opening; a bottom piece having a bottom edge being detachably mounted slidably on the rail; and
- a window being mounted in the frame.

* * * * *